US012340356B2

(12) United States Patent
Shmulevich et al.

(10) Patent No.: US 12,340,356 B2
(45) Date of Patent: Jun. 24, 2025

(54) UNATTENDED MOBILE POINT OF SALE SYSTEM

(71) Applicant: SECURTER SYSTEMS INC., Bradford (CA)

(72) Inventors: Michael Shmulevich, Thornhill (CA); Vladimir Krupnikov, Maple (CA); Steve Epstein, Bradford (CA)

(73) Assignee: SECURTER SYSTEMS INC., Bradford (CA)

( * ) Notice: Subject to any disclaimer, the term of this patent is extended or adjusted under 35 U.S.C. 154(b) by 308 days.

(21) Appl. No.: 18/029,777

(22) PCT Filed: Oct. 5, 2021

(86) PCT No.: PCT/IB2021/059140
§ 371 (c)(1),
(2) Date: Mar. 31, 2023

(87) PCT Pub. No.: WO2022/074569
PCT Pub. Date: Apr. 14, 2022

(65) Prior Publication Data
US 2023/0385793 A1    Nov. 30, 2023

Related U.S. Application Data

(60) Provisional application No. 63/087,835, filed on Oct. 5, 2020.

(51) Int. Cl.
*G06Q 20/32* (2012.01)
*G06Q 20/18* (2012.01)
(Continued)

(52) U.S. Cl.
CPC ......... *G06Q 20/18* (2013.01); *G06Q 20/3263* (2020.05); *G06Q 20/3276* (2013.01);
(Continued)

(58) Field of Classification Search
CPC ............... G06Q 20/18; G06Q 20/3263; G06Q 20/3276; G06Q 20/3278; G06Q 20/352;
(Continued)

(56) References Cited

U.S. PATENT DOCUMENTS 9,038,894 B2 * 5/2015 Khalid ............... G06Q 20/3278
235/380
10,510,074 B1 * 12/2019 Rule .................. G06Q 20/3825
(Continued)

FOREIGN PATENT DOCUMENTS

| CA | 2726748 | 6/2012 |
| WO | 2015101439 | 7/2015 |

(Continued)

OTHER PUBLICATIONS

International Search Report for PCT/IB2021/059140 dated Dec. 14, 2021.
(Continued)

*Primary Examiner* — Ashford S Hayles
(74) *Attorney, Agent, or Firm* — Aleksandar Nikolic

(57) ABSTRACT

A computer-implemented method including, submitting a payment transaction through a network to a merchant website; receiving the payment transaction by a widget program on the merchant website; submitting, a payment transaction request through the network to a backend application; receiving, the payment transaction request; issuing and submitting a transaction identification number through the network to the widget program; creating a matrix barcode from the transaction identification number; scanning the matrix barcode using a mobile computing device; activating a mobile application to receive payment and receiving payment data from a payment card having a card microchip communicating with an EMV library non-embedded in the mobile application; encrypting the payment data and send-
(Continued)

ing the payment data to the backend application; the backend application submitting the payment data to a payment service provider; receiving the payment transaction results; and notifying the widget program and the mobile application of the payment transaction results.

33 Claims, 6 Drawing Sheets

(51) Int. Cl.
  *G06Q 20/34* (2012.01)
  *G06Q 20/38* (2012.01)
(52) U.S. Cl.
  CPC ....... *G06Q 20/3278* (2013.01); *G06Q 20/352* (2013.01); *G06Q 20/38215* (2013.01)
(58) Field of Classification Search
  CPC ............. G06Q 20/38215; G06Q 20/02; G06Q 20/0855; G06Q 20/12; G06Q 20/3223; G06Q 20/3267; G06Q 20/353; G06Q 20/383; G06Q 20/42; G06Q 20/202
  See application file for complete search history.

(56) References Cited

U.S. PATENT DOCUMENTS

| | | | | |
|---|---|---|---|---|
| 2008/0270514 | A1* | 10/2008 | Soares Pi Farias | G06Q 20/20 709/228 |
| 2014/0138435 | A1* | 5/2014 | Khalid | G06Q 20/227 235/380 |
| 2014/0207682 | A1* | 7/2014 | Wolfond | G06Q 20/12 705/44 |
| 2014/0337175 | A1* | 11/2014 | Katzin | G06Q 20/326 705/26.62 |
| 2015/0206124 | A1* | 7/2015 | Aubin | G06Q 20/3226 705/44 |
| 2016/0086161 | A1* | 3/2016 | Zhou | G06F 3/04886 705/44 |
| 2016/0155112 | A1* | 6/2016 | Phillips | G06Q 20/3276 235/379 |
| 2016/0275505 | A1* | 9/2016 | Salian | G06Q 20/325 |
| 2017/0076273 | A1* | 3/2017 | Xing | G07G 1/14 |
| 2019/0066089 | A1* | 2/2019 | Miryala | G06Q 20/367 |
| 2019/0295054 | A1* | 9/2019 | Purves | G06Q 20/28 |
| 2020/0082384 | A1* | 3/2020 | Guise | G06Q 20/356 |
| 2020/0380483 | A1* | 12/2020 | Kang | G06Q 20/3278 |

FOREIGN PATENT DOCUMENTS

| | | |
|---|---|---|
| WO | 2017021882 | 2/2017 |
| WO | 2017103701 | 6/2017 |

OTHER PUBLICATIONS

Canadian Intellectual Property CIPO Examination Notes for PCT/IB2021/059140 dated.

* cited by examiner

UNATTENDED MOBILE POINT OF SALE SYSTEM

CROSS-REFERENCE TO RELATED APPLICATIONS

This application is a national stage filing under Section 371 of International Application No. PCT/IB2021/059140, filed on Oct. 5, 2021, and published on Apr. 14, 2022 as WO 2022/074569 A1. In addition this application claims priority under 35 U.S.C. § 119 to U.S. Provisional Application Ser. No. 63/087,835, filed Oct. 5, 2020, which is herein incorporated by reference in its entirety.

BACKGROUND OF THE INVENTION

Technical Field

This invention relates to electronic payment systems. More specifically, this invention relates to electronic payment systems, methods, and computer program products, using payment cards.

Background Information

Electronic payment systems exist in physical store locations and for purchases of goods and services through websites, and computer program applications. Current payment terminal methods exist using attended mobile point of sale devices and unattended payment terminals at most physical store locations. For internet purchases, a customer is prompted to enter credit card information into a merchant's payment system or to log into a third party system such as PayPal®, Apply Pay®, or Google Pay®, which stores credit card information.

An attended mobile point of sale device is a payment terminal under the control of a merchant. An attended mobile point of sale device may be a dedicated wireless device, a smartphone, or tablet. Such a device is activated by the merchant and is passed to the customer for payment using a payment card. Payment service providers require mobile point of sale devices to comply with some of or all of three levels of security provided for by EMVco. Depending on the hardware/software interaction, payment service providers may also require that mobile point of sale devices comply with the ISO/IEC 7816 standard. The attended mobile point of sale device is typically provided by a payment service provider (PSP) to the merchant and may include a form of card reader that plugs into the mobile device for processing payment cards.

Unattended payment terminals (e.g. those used at gas stations, parking terminals, and public transit ticketing machines) are unmanned, are generally not movable and payments are made by inserting a card in or tapping a card on such a device. Alternatively, there are wallet program applications that reside on mobile devices which may also be used through Near Field Communication or similar radio frequency signals (wallet programs may also be used with attended devices).

Increasingly, purchases are made using a personal computer or a mobile computing device such as a phone or smartphone, tablet, laptop, watch, or similar device. However, whether purchases are made at brick and mortar stores or through the internet, websites, or program applications, payment card information is shared with the merchants of goods or services or with third parties. Because of the extensive sharing of payment card information, personal data located or associated with the payment card becomes vulnerable.

SUMMARY OF THE INVENTION

The shortcomings of the prior art are overcome, and additional advantages are provided, through the provision, in one aspect, of a method for generating and executing actions based on data from a computer. The method includes submitting, by a first processor, a payment transaction through a network to a merchant website; receiving, by a second processor, said payment transaction and directing said payment transaction to activate a widget program on said merchant website; submitting, by said second processor, a payment transaction request from said widget program through said network to a backend application; receiving, by a third processor, said payment transaction request, said backend application creates, by the third processor, a transaction identification number; submitting, by said third processor, said transaction identification number through the network to said widget program; receiving, by said second processor, said transaction identification number and directing said transaction identification number to said widget program; converting, by said widget program, said transaction identification number into a matrix barcode and submitting said matrix barcode through the network to said first processor; displaying, by said first processor, said matrix barcode on a first graphical user interface; using a mobile computing device to scan said matrix barcode, said mobile computing device having a fourth processor, memory, a graphical user interface, a near field communication device, a mobile payment application, and an Europay, MasterCard, Visa (EMV) library, said EMV library being non-embedded in said mobile payment application; converting, by said fourth processor, said matrix barcode into a request for payment by a payment card having a card microchip; displaying, by said fourth processor, said request for payment on said mobile computing device graphical user interface by said mobile payment application; placing said card microchip of said payment card in proximity to said near field communication (NFC) sensor, said card microchip communicates with said NFC sensor; receiving instructions from the EMV library, by said fourth processor, the NFC sensor receives payment data from said card microchip; submitting said payment data to said mobile application; encrypting, by said fourth processor, said payment data and transaction identification number using a public key of said mobile computing app; submitting, by said fourth processor, encrypted payment data and said transaction identification number through said network to said backend application; receiving, by said third processor, encrypted payment data and said transaction identification number; decrypting, by said third processor, encrypted payment data and said transaction identification number; submitting, by said third processor, payment data to a payment service provider through the network; receiving, by said third processors, from said payment service provider a transaction result; sending, by said third processor, said transaction result, through said network to said second processor and said fourth processor; sending, by said second processor, said transaction result through said network to said first processor; receiving, by said fourth processor, said transaction result and displaying on said mobile computing device graphical user interface; and receiving, by said first processor, transaction results and displaying on said second graphical user interface.

Further shortcomings of the prior art are overcome, and additional advantages are provided, through the provision, in one aspect, of a system including a plurality of computers each having a memory, one or more processor in communications with the memory, program instructions executable by the one or more processors via the memory to perform a method, the method including the system configured to perform a method. The method includes submitting, by a first processor, a payment transaction through a network to a merchant website; receiving, by a second processor, said payment transaction and directing said payment transaction to activate a widget program on said merchant website; submitting, by said second processor, a payment transaction request from said widget program through said network to a backend application; receiving, by a third processor, said payment transaction request, said backend application creates, by the third processor, a transaction identification number; submitting, by said third processor, said transaction identification number through the network to said widget program; receiving, by said second processor, said transaction identification number and directing said transaction identification number to said widget program; converting, by said widget program, said transaction identification number into a matrix barcode and submitting said matrix barcode through the network to said first processor; displaying, by said first processor, said matrix barcode on a first graphical user interface; using a mobile computing device to scan said matrix barcode, said mobile computing device having a fourth processor, memory, a graphical user interface, a near field communication device, a mobile payment application, and an Europay, MasterCard, Visa (EMV) library, said EMV library being non-embedded in said mobile payment application; converting, by said fourth processor, said matrix barcode into a request for payment by a payment card having an card microchip; displaying, by said fourth processor, said request for payment on said mobile computing device graphical user interface by said mobile payment application; placing said card microchip of said payment card in proximity to said near field communication (NFC) sensor, said card microchip communicates with said NFC sensor; receiving instructions from the EMV library, by said fourth processor, the NFC sensor receives payment data from said card microchip; submitting said payment data to said mobile application; encrypting, by said fourth processor, said payment data and transaction identification number using a public key of said mobile computing app; submitting, by said fourth processor, encrypted payment data and said transaction identification number through said network to said backend application; receiving, by said third processor, encrypted payment data and said transaction identification number; decrypting, by said third processor, encrypted payment data and said transaction identification number; submitting, by said third processor, payment data to a payment service provider through the network; receiving, by said third processors, from said payment service provider a transaction result; sending, by said third processor, said transaction result, through said network to said second processor and said fourth processor; sending, by said second processor, said transaction result through said network to said first processor; receiving, by said fourth processor, said transaction result and displaying on said mobile computing device graphical user interface; and receiving, by said first processor, transaction results and displaying on said second graphical user interface.

Shortcomings of the prior art are overcome and additional advantages are provided through the provision of a computer program product for generating and executing actions based on data from computer device. The computer program product has a computer readable storage medium readable by one or more processors and storing instructions for execution by one or more processors for performing a method. The method includes, for instance: submitting, by a first processor, a payment transaction through a network to a merchant website; receiving, by a second processor, said payment transaction and directing said payment transaction to activate a widget program on said merchant website; submitting, by said second processor, a payment transaction request from said widget program through said network to a backend application; receiving, by a third processor, said payment transaction request, said backend application creates, by the third processor, a transaction identification number; submitting, by said third processor, said transaction identification number through the network to said widget program; receiving, by said second processor, said transaction identification number and directing said transaction identification number to said widget program; converting, by said widget program, said transaction identification number into a matrix barcode and submitting said matrix barcode through the network to said first processor; displaying, by said first processor, said matrix barcode on a first graphical user interface; using a mobile computing device to scan said matrix barcode, said mobile computing device having a fourth processor, memory, a graphical user interface, a near field communication device, a mobile payment application, and an Europay, MasterCard, Visa (EMV) library, said EMV library being non-embedded in said mobile payment application; converting, by said fourth processor, said matrix barcode into a request for payment by a payment card having an card microchip; displaying, by said fourth processor, said request for payment on said mobile computing device graphical user interface by said mobile payment application; placing said card microchip of said payment card in proximity to said near field communication (NFC) sensor, said card microchip communicates with said NFC sensor; receiving instructions from the EMV library, by said fourth processor, the NFC sensor receives payment data from said card microchip; submitting said payment data to said mobile application; encrypting, by said fourth processor, said payment data and transaction identification number using a public key of said mobile computing app; submitting, by said fourth processor, encrypted payment data and said transaction identification number through said network to said backend application; receiving, by said third processor, encrypted payment data and said transaction identification number; decrypting, by said third processor, encrypted payment data and said transaction identification number; submitting, by said third processor, payment data to a payment service provider through the network; receiving, by said third processors, from said payment service provider a transaction result; sending, by said third processor, said transaction result, through said network to said second processor and said fourth processor; sending, by said second processor, said transaction result through said network to said first processor; receiving, by said fourth processor, said transaction result and displaying on said mobile computing device graphical user interface; and receiving, by said first processor, transaction results and displaying on said second graphical user interface.

Further shortcomings of the prior art are overcome, and additional advantages are provided, through the provision, in one aspect, of a method for generating and executing actions based on data from a computer. The method includes, submitting by a mobile computing device, a payment transaction through a network to a merchant website, said mobile computing device having a first processor, memory, a graphical user interface, a near field communication device, a mobile payment application, and an Europay, MasterCard, Visa (EMV) library, said EMV library being non-embedded in said mobile payment application; receiving, by a second processor, said payment transaction and directing said payment transaction to activate a widget program on said merchant website; submitting, by said second processor, a payment transaction request from said widget program through said network to a backend application; receiving, by a third processor, said payment transaction request, said backend application creates, by the third processor, a transaction identification number; submitting, by said third processor, said transaction identification number through the network to said widget program; receiving, by said second processor, said transaction identification number and directing said transaction identification number to said widget program; converting, by said widget program, said transaction identification number into confirmation data through the network to said first processor; converting, by said first processor, said confirmation data into a request for payment by a payment card having a card microchip and displaying said confirmation data on said graphical user interface; placing said card microchip of said payment card in proximity to said near field communication (NFC) sensor, said card microchip communicates with said NFC sensor; receiving instructions from the EMV library, by said first processor, the NFC sensor receives payment data from said card microchip; submitting said payment data to said mobile application; encrypting, by said first processor, said payment data and transaction identification number using a public key of said mobile computing app; submitting, by said first processor, encrypted payment data and said transaction identification number through said network to said backend application; receiving, by said third processor, encrypted payment data and said transaction identification number; decrypting, by said third processor, encrypted payment data and said transaction identification number; submitting, by said third processor, payment data to a payment service provider through the network; receiving, by said third processors, from said payment service provider a transaction result; sending, by said third processor, said transaction result, through said network to said second processor and said first processor; sending, by said second processor, said transaction result through said network to said first processor; receiving, by said first processor, transaction results and displaying on said graphical user interface.

Methods, computer program products, and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

DETAILED DESCRIPTION OF THE INVENTION

Figure 1:
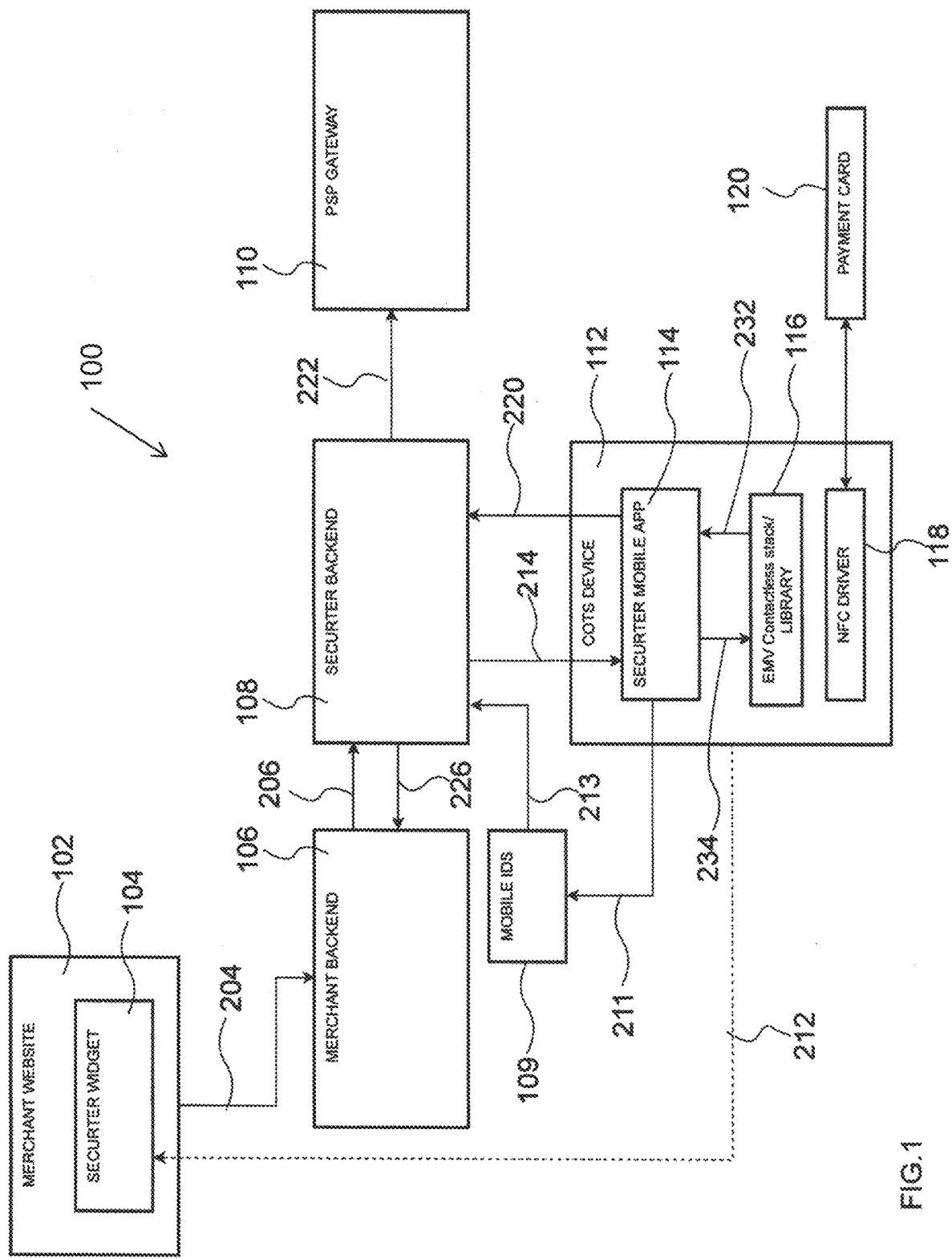
FIG. 1 depicts a functional component diagram of a payment system, in accordance with one or more embodiments set forth herein.

Aspects of the present disclosure and certain embodiments, features, advantages, and details thereof, are explained more fully below with reference to the non-limiting examples illustrated in the accompanying drawings. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure. Furthermore, although certain methods are described with reference to certain steps that are presented herein in a certain order, in many instances, these steps may be performed in any order as may be appreciated by one having ordinary skill in the art. The methods are not limited to the particular arrangement of steps disclosed herein.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one embodiment" are not intended to be interpreted as excluding the existence of additional embodiments that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any embodiments that "comprises," "has," "includes" or "contains" the presence of stated features, integers, steps, operations, elements, and/or components, but do not preclude the presence or addition of one or more other features, integers, steps, operations, elements, components and/or groups thereof. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be."

The invention herein will be better understood by reference to the figures. Referring to the drawings, wherein like reference numerals are used to indicate like or analogous components throughout the several views, and with particular reference to FIG. 1, a payment system 100 is depicted as a component diagram entities and units participating in a remote smart card transaction. The components depicted are a merchant website 102 and a securter widget 104, with the merchant website 102 depicted as being in communication with a merchant backend application 106. The merchant backend application 106 is depicted as being in communication with a transaction confirmation backend application (also referred to as a backend application or a "securter backend") 108. The securter backend 108 is depicted as being in communication with a payment service provider gateway ("PSP gateway") 110, a mobile intrusion detection system ("IDS") 109, and a commercial off-the-shelf mobile devices ("COTS device") 112. The COTS device 112 may be, for example, a mobile phone, a smartphone, a tablet, or similar mobile computing device. However, those skilled in the art will understand that other embodiments may also include COTS device 112 that is a laptop or a desktop. The COTS device 112 may include, for example, a mobile payment application program (also referred to as the "securter mobile app") 114, an NFC driver 118, and an Europay, MasterCard®, Visa® ("EMV") library 116. The EMV library 116 is based on a standard determined by a consortium of financial services companies ("EMVco"), under which architecture, structure, specifications, communication logic, cryptographic procedures, and other elements of contactless card transactions are determined for communication between a card reader device and a payment/loyalty integrated circuit card having a card microchip. Financial services companies that are not part of the EMVco consortium may also provide kernels for the EMV library 116 that conform to the EMV standard or add a kernel to a library program of financial service providers. The term EMV library is used herein because it is a current standard used by financial services providers, whether part of EMVco or not. The EMV library 116 is referred to as a singular library but may be, for example, composed of a plurality of software components, packages, or programs certified and approved by payment/loyalty card issuers' standards and forming a set of industry programs or a program stack. The library 116 may also include common programs used by some or all of the programs within the library. The library software provides instructions for data collection from the payment/loyalty card for secure payments based on each card issuer's standard. The payment/loyalty card libraries may include, for example, instructions from VISA®, MasterCard®, American Express®, Discover®, and etc. The payment/loyalty card libraries may also include payment instructions from card providers such as, for example, Interac® who are not currently part of EMVco but may provide an EMV library kernel that may reside and use common programs of the EMV library. Also depicted is a payment card 120 having a card microchip, depicted as being in communication contact with the COTS device 112. The payment card 120 may also be, for example, a credit card, a debit card, an automated teller machine (ATM) card, a loyalty card, and/or any other card having a microprocessor or microchip that provides payment for commercial transactions.

With continued reference to FIG. 1, the EMV library 116 and the securter mobile app 114 are both stored on the COTS device 112 but the EMV library 116 is not embedded (non-embedded) within the securter mobile app 114 and both are independent programs. However, the securter mobile app 114 and the library may, for example, communicate with each other and exchange data. A transaction initiation communication 234 may be, for example, sent from the securter mobile app 114 to the EMV library 116, providing information to initiate a contactless transaction. The data sent in the transaction initiation communication 234 may include, for example, a transaction amount, a currency code, a transaction type, and a merchant ID. Depending on the card issuer, the exact information passed between the securter mobile app 114 and the EMV library 116 may vary. The EMV library 116 may, for example, collect all the data communicated from the securter mobile app 114 and then use all the data, organizing the data according card issuer specifications. The EMV library 116 may, for example, select data relevant for a particular card issuer or payment method. Once the data is received from the securter mobile app 114, the EMV library 116 may use the data to, for example, collect payment information from the payment card 120. When a transaction is completed, a completion notification signal 232 is sent by the EMV library 116 to the securter mobile app 114, confirming that the payment has been collected.

Communication between the merchant backend 106 and the securter backend 108 is encrypted. The communication may be, for example, key signed through an exchange of public/private keys to maintain encryption. Communication between the securter backend 108 and the securter mobile app 114 may also be, for example, key signed with an exchange of public/private keys to maintain encryption.

Figure 1A:
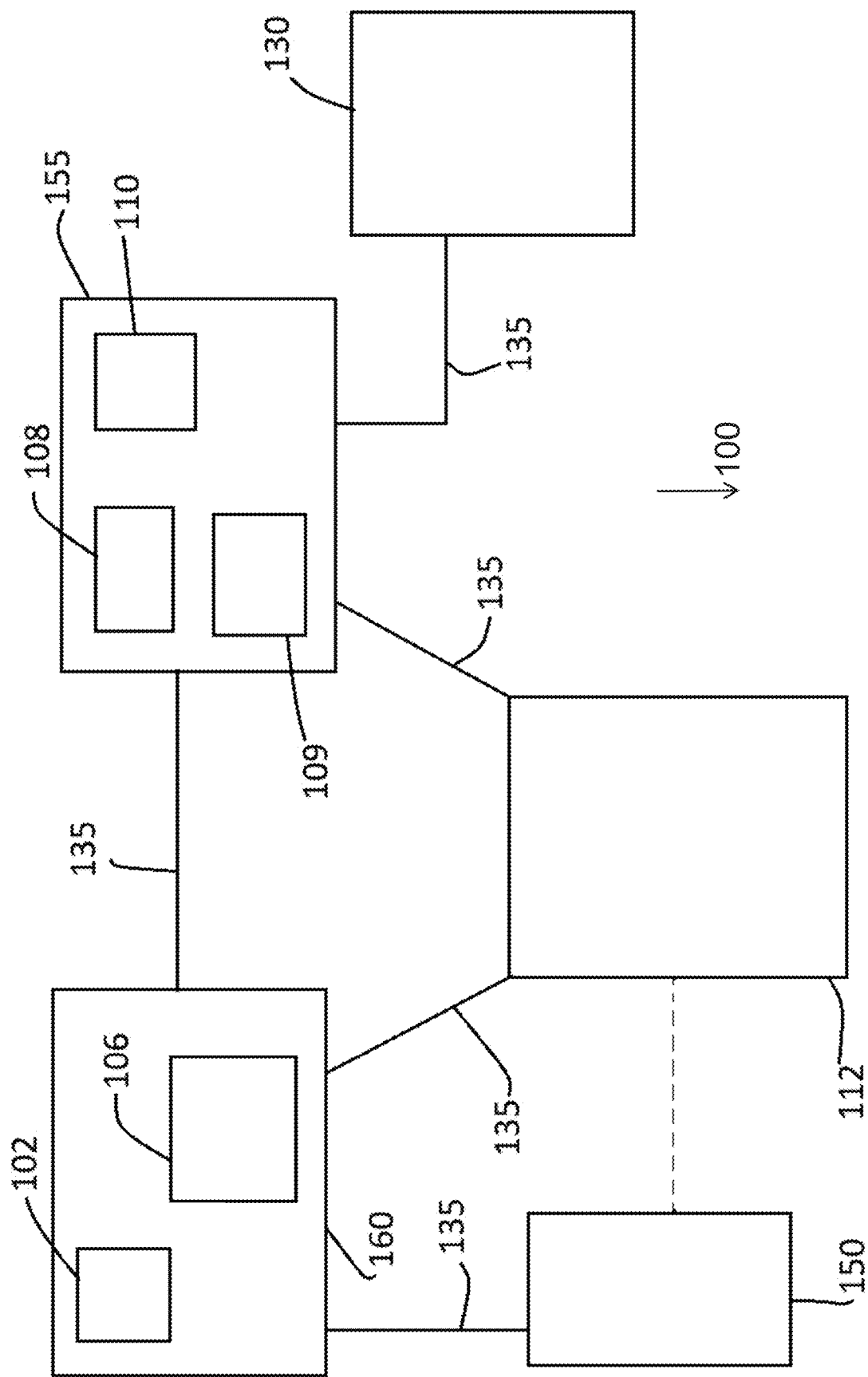
FIG. 1A depicts a component diagram of devices of the payment system of FIG. 1, in accordance with one or more embodiments set forth herein.

Referring to FIG. 1A, the payment system 100 is depicted as diagram of devices with the merchant website 102 and the merchant backend 106 depicted as being on a first server 160. The first server 160 may also be referred to a merchant server. The securter backend 108, the PSP gateway 110, and the IDS 109 depicted as being on a second server 155. The second server 155 may also be referred to as a backend server. The second server 155 and the first server 160 are depicted as being connected by a network 135. The second server 155 may be in network communication with a payment service provider server ("PSP server") 130. The COTS device 112 may also be, for example, connected by the network 135 to both the second server 155 and the first server 160. The network 135 may be, for example, the internet and/or a mobile device data communication network. Further depicted is a personal computing device 150 in network communication with the first server 160. While the second server 155, the first server 160, and the PSP server 130 are depicted as individual servers, the second server 155, the first server 160, and the PSP server 130 may also be, for example, a plurality of servers or a networked grouping of servers forming a cloud-space.

With continued reference to FIG. 1A, the COTS device 112 may be, for example, an unattended payment device. An unattended payment device is one that is not under control of, for example, a merchant, a payment service provider, a payment processor, or a payment card issuer. As depicted in FIGS. 1 and 1A, the COTS device 112 may be, for example, a personal device with operation and control of the device and device contents, including programs, fully or substantially under control of the customer, and/or user of the device. A further element of COTS device 112 is that securter mobile app 114 and EMV libraries 116 may be, for example, installed by the device user, with such installation being outside the control of the merchant, the payment service provider, the payment processor, or the payment card issuer.

For an unattended payment device (e.g. COTS device 112), it is beneficial for a payment transaction system (e.g. payment transaction system 100) that interacts with most PSPs to have security to maintain transaction anonymity, and security to protect payment data and information of the customer.

Figure 1B:
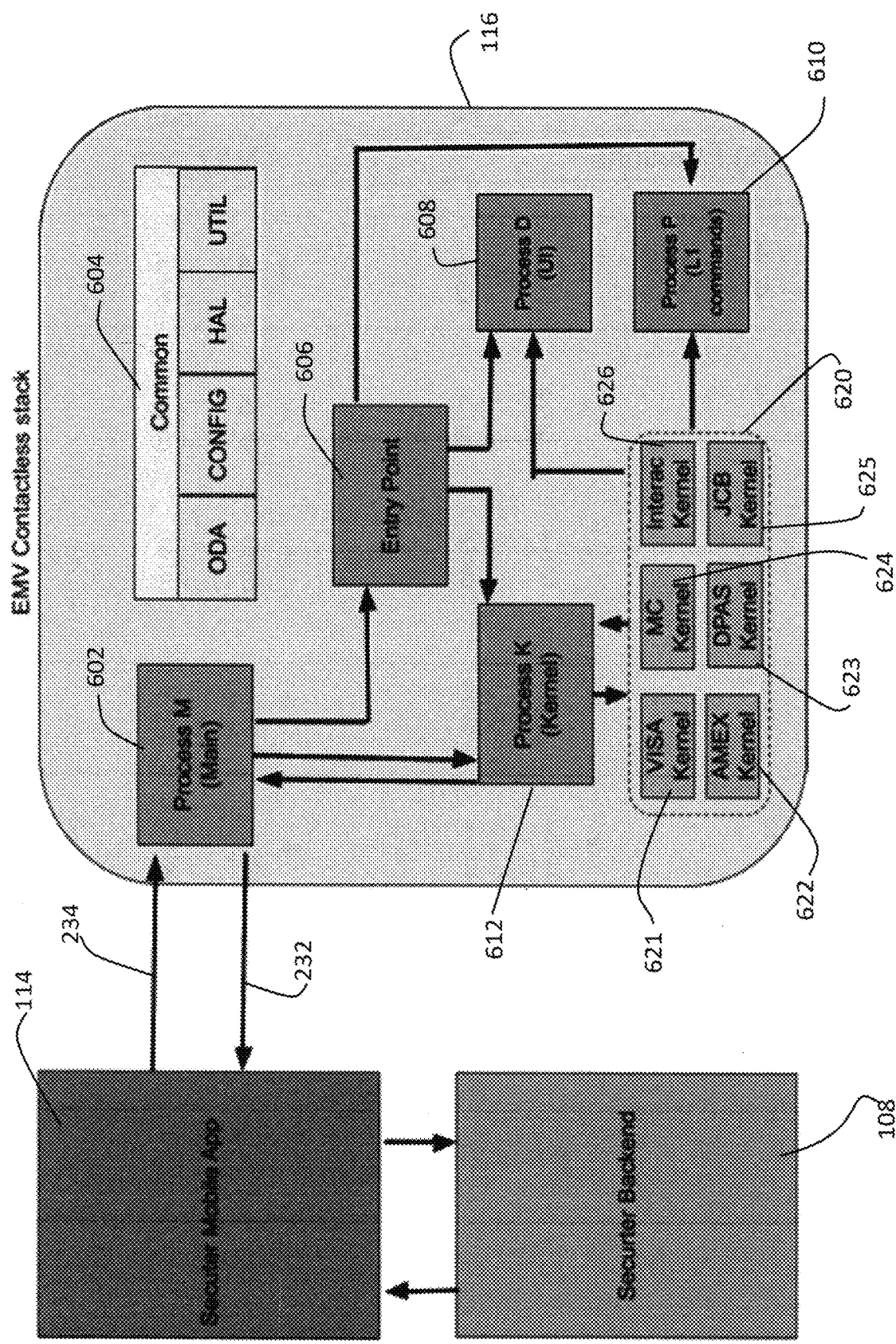
FIG. 1B depicts a functional component diagram of a mobile payment application program, a backend, and an EMV library of FIG. 1, in accordance with one or more embodiments set forth herein.

FIG. 1B depicts the EMV library 116 and the interaction with the securter mobile app 114 and the securter backend 108. The EMV library 116 provides for payment transactions over a contactless interface. To perform transactions over a contactless interface POS/mPOS should have certain levels of certification type approved by EMVco or alternatively by other relevant card issuers. There are three levels of certification which may be attainable, such as, for example, hardware certification (L1), software certification (L2), and system certification (L3). L1 certification verifies that a device (e.g. the COTS device 112) fulfills specifications related to analog/digital signals of the radio frequency ("RF") field and implementation of application protocol data unit ("APDU") command driver (the communication unit between a payment card reader and a chipped payment card). Many common mobile phones and mobile devices are already compliant with the L1 standard. L2 certification verifies that software implementation of contactless transaction flow logic meets conditions and executes transaction following acquirer specifications. L2 certification is significant for EMV libraries embedded within software. L3 certification verifies the system after the L1 and L2 certifications have been achieved and is a certification generally granted by the payment service provider. An embodiment of the payment system 100 may include certification at the L1, L2, and L3 levels.

For COTS devices, and in particular unattended COTS devices (e.g. COTS device 112), a current standard is described in the PCI Security Standards Council's Contactless Payment on Commercial Off-the-Shelf Mobile Devices standard (CPOC standard).

The EMV library 116 is not embedded within the securter mobile app 114 but is a separate program or stack. The EMV library 116 has a common program segment 604, having software used by other software programs within the EMV library 116. The common segment 604 may include, for example, an offline data authentication ("ODA"), a configuration process, a BER-TLV (basic encoding rules tag field, length, and value) Database operation, and a hardware abstraction layer ("HAL"). The EMV library 116 may also include, for example, a main processing program, 602, a kernel processing program 612, an L1 processing program 610, a display processing program 608, an entry point program 606, and an issuer kernel programs repository 620.

Figure 3:
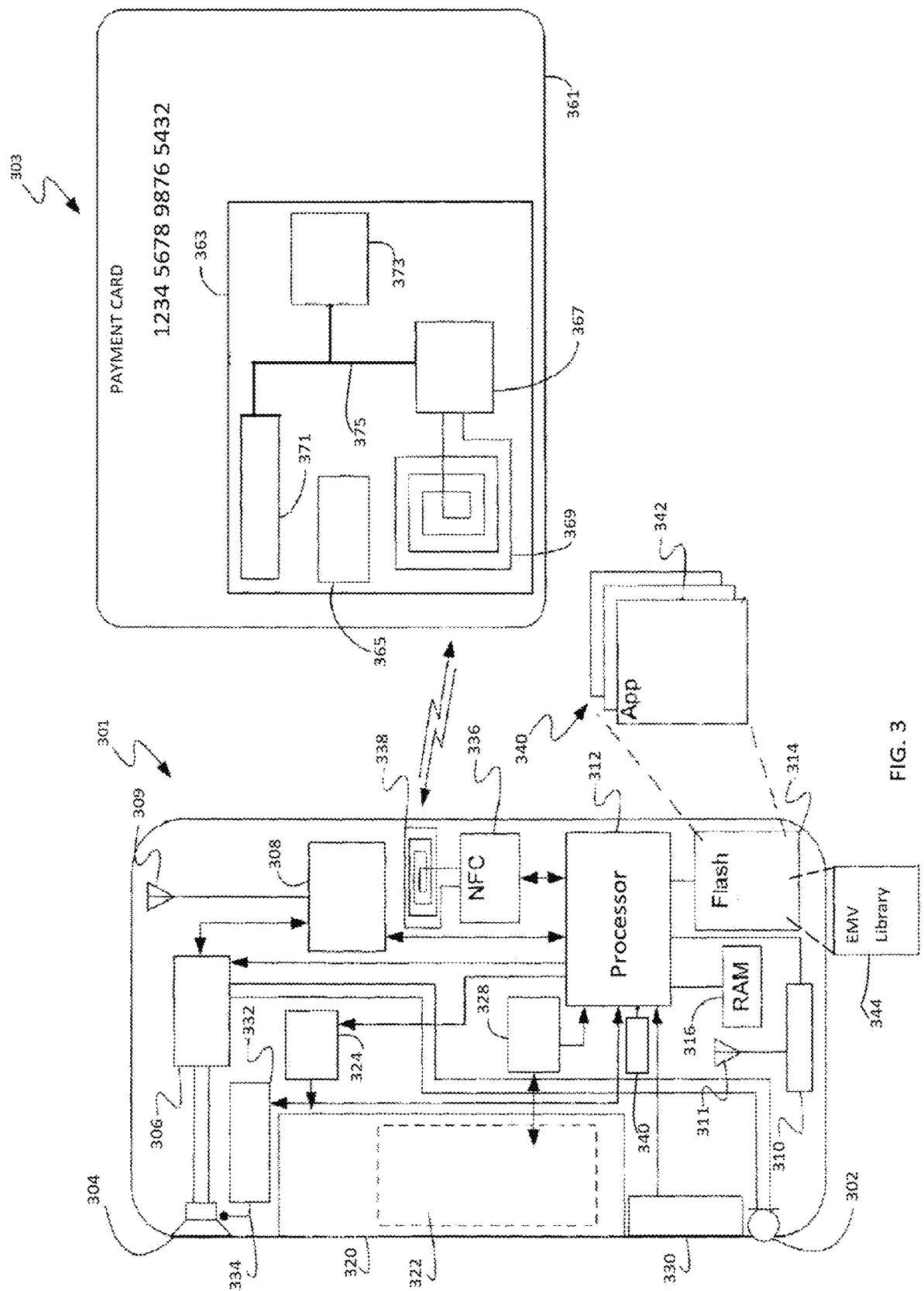
FIG. 3 depicts an idealized mobile device and contactless payment card, in accordance with one or more embodiments set forth herein.

With reference to FIG. 3, a generic COTS device 301 is depicted in proximal communication range with a generic chip-based payment card 303. The generic COTS device 301 has a processor 312, RAM 306, flash memory 314, a touchscreen video display 320, a camera 340, a screen touch sensor 322 connected to a sensor circuit 328 collecting screen touch data to the processor 312 for processing and via a video driver 324, displaying display touch manipulations on the touchscreen video display 320. Also included are a transceiver 308 connected to a transceiver antenna 309, a Wi-Fi transceiver 310 connected to a Wi-Fi antenna 311, and an NFC sensor 336 housing Near Field Communication ("NFC") sensor, including an NFC type radio transceiver, connected to an NFC transceiver antenna 338. The flash memory may store, for example, a plurality of application or computer programs 342 and at least one card reader library 344.

The generic COTS device 301 represents an idealized version of the device of FIGS. 1 and 1A identified as the COTS device 112. One example of an application of the plurality of applications 342 of FIG. 3 which perform actions executed by the processor 312 is the securter mobile app 114 of FIG. 1. An example of the at least one card reader library 344 of FIG. 3 is the EMV library 116 for FIG. 1.

With continued reference to FIG. 3, the generic chip-based payment card 303 has a card stock 361 into which is embedded an EMV microprocessor or card microchip 363 recognized for reading by payment systems recognized by payment services providers. The card microchip 363 has within a processor 373, at least one memory 371, a radio frequency interface transceiver ("RFI transceiver") 367 having a transceiver antenna 369, with the processor 373, at least one memory 371, and the RFI transceiver 367 connected by a communication bus system 375. The RFI transceiver 367 and antenna 369 may be, for example, compatible for and capable of communication with the NFC sensor 336 and antenna 338 of the COTS device 301. The generic chip-based payment card 303 represents an idealized version of the device of FIG. 1 identified as payment card 120. The payment card 120 may be, for example, a card provided by and compatible with VISA®, MasterCard®, American Express®, Discover®, and etc.

With reference to FIG. 1B, the main processing program 602 of the EMV library 116 may, for example, communicate with a hosted application (e.g. the securter mobile app 114), to initiate a new transaction, and to coordinates card and point of sale ("POS") interaction results. The main processing program 602 is itself a library and may be composed of one or multiple programs. The main processing program 602 may be activated when contacted by the securter mobile app 114. By bringing a payment card (e.g. the payment card 120) into proximity of the NFC sensor 336, the EMV library communicates through radio frequency signals with the payment card through the library programs. The entry point program 606 may, for example, interact with the main processing program 602 to call the securter mobile app 114 and may also initialize the kernel processing program 612 to retrieve data read from the payment card based on POS configuration. The kernel processing program 612 may, for example, implement an interface to the payment card issuer's kernel in the issuer kernel program repository 620. The issuer kernel program repository 620 has programs specific to each PSP. The issuer kernels depicted are the VISA kernel 621, the AMEX kernel 622, the DPAS kernel 623, the MC kernel 624, the JCB kernel, and the Interac kernel 626. However, the list of issuer kernels depicted is not a complete list of available issuers and others may be included in the issuer kernel repository 620. These issuer kernels are selected by the kernel processing program 612 based on entry point component results, such as information on the payment card chip 363. Every kernel includes contactless transaction logic based on EMVco/PSP specifications and such kernel information may be, for example, passed to the main processing program 602 to retrieve transaction information from the selected issuer kernel and to build the transaction result based on information collected from the payment card chip 363 and the transaction details. The L1 processing program 610 may, for example, communicate with a payment card by sending APDU commands and process responses from the payment card based on instructions from the issuer's kernel. The display processing program 608 may, for example, implement user interface requests and execute these requests on the POS hardware, (e.g. through the touchscreen video display 320, the keyboard 330, the microphone 302, or other input/output modes on COTS device 112).

Figure 4:
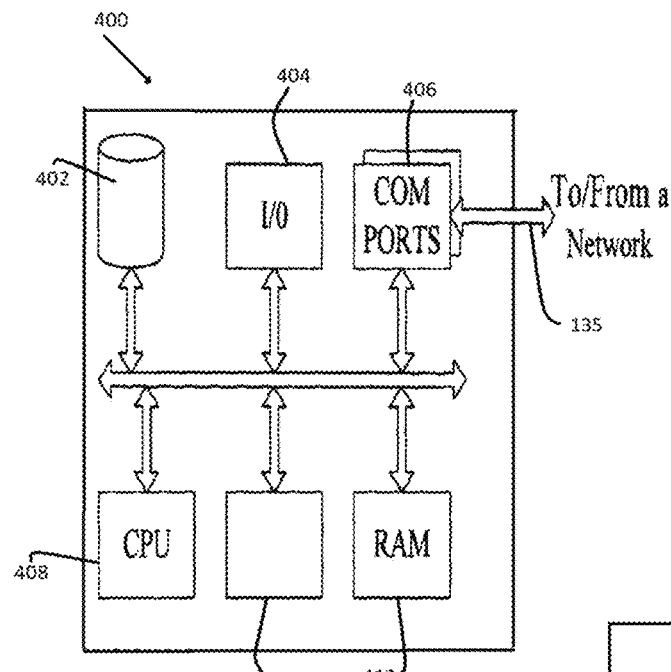
FIG. 4 depicts a functional component diagram of a generic computer acting as a server or website host, in accordance with one or more embodiments set forth herein.

With reference to FIG. 4, a generic server 400 is depicted having a processor 408, read only memory (ROM) 410, random access memory (RAM) 412, communication ports 406, data storage 402 and device input/output ports 404. The components of the generic server are connected forming a computing device. Data storage may include a database for organizing stored data. Communication ports 406 may include a wired and wireless connection to other computer devices, other servers, and/or a network such as the internet. The generic servicer 400 of FIG. 4 represents an idealized version of the devices of FIG. 1A identified as the first server 160 and the second server 155. PSP server 130 may also be represented by the generic server 400 of FIG. 4.

The first server 160 may have, for example, a first processor, first read only memory (ROM), first random access memory (RAM), first communication ports, first data storage, and first device input/output ports. The second server 155 may have, for example, a second processor, second read only memory (ROM), second random access memory (RAM), second communication ports, second data storage, and second device input/output ports. In reference to first server 160 and second server 155, the examples provided refer to a single server, however there may be embodiments with a plurality of servers or embodiments that with a cloud environment.

Figure 5:
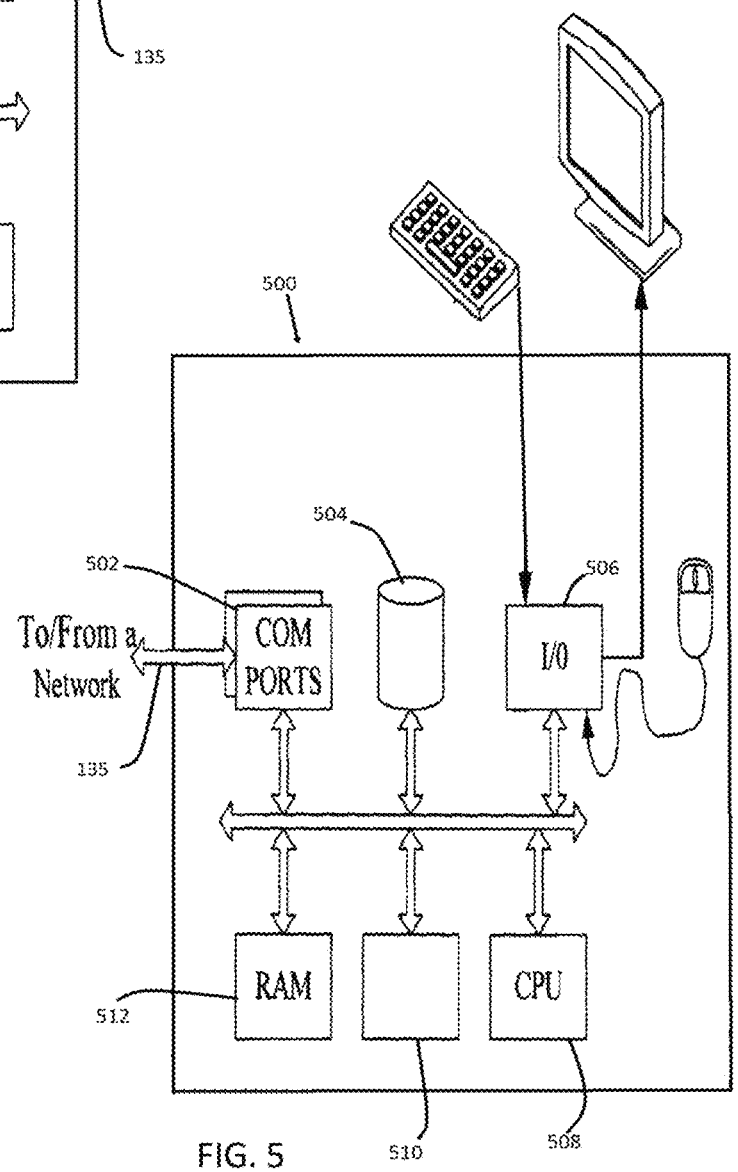
FIG. 5 depicts a functional component diagram of a generic computer, in accordance with one or more embodiments set forth herein.

With reference to FIG. 5, a generic computer 500 is depicted having a processor 508, read only memory (ROM) 510, random access memory (RAM) 512, communication ports 502, data storage 504, and input/output ports 506. Input/output ports 506 may include inputs from a keyboard, mouse, or video touchscreen and outputs to a video display device. The components of the generic computer are connected, forming a computing device. Communication ports 502 include a wired or wireless connection to a network, such as, for example the internet. The generic computer 500 represents an idealized version of the device of FIG. 1A identified as the personal computing device 150.

Referring to FIG. 1, payment card 120 is compatible with and capable of contactless communication with the COTS device 112. The securter mobile app 114 installed on the operating system of the COTS device's 112, uses instructions in the EMV library 116 to facilitate EMV communication with the smart card 120 by using the NFC driver 118 to provide instructions of the NFC sensor 338. The term driver shall include computer code instructions for a hardware device such as the NFC driver 118 providing instructions for the NFC sensor 336 (or the video driver 324) for interaction with an operating system of a computer such as, for example, the COTS device 112, the second server 155, the first server 160, and the general computer 150.

With reference to FIGS. 1 and 1A, the securter backend application 108, running on the second server 155, includes an application programming interface ("API") for communication and interaction with the PSP Gateway 110. The API may be, for example, a set of instructions or procedures implemented using a representational state transfer ("REST") architectural style. However, API's created using other architectural styles may also be used for communication with payment service providers. The PSP Gateway 110 may not be a single program but may include a plurality of programs or a stack, with each having its own API for communication and access to a particular PSP Gateway for communication with a specific payment service provider.

The merchant backend 106 is a program running on a first server 160. While FIG. 1A depicts the merchant website 102 on the first server 160, the merchant website 102 may be on another computer or on a plurality of computers in a cloud environment. Furthermore, while first server 160 is depicted as a single server, in other embodiments the merchant backend 106 may run on a plurality of computers in a cloud environment. By the processor (e.g. processor 408), the merchant website 102 and the merchant backend 106 are in in communication with each other. The communication between the merchant website 102 and the merchant backend 106 may be within the first server 160 or may be across a network. The merchant backend 106 running on first server 160 is also in communication with the securter backend 108 running on the second server 155, with such communication being across a network such as, for example, the internet. The merchant website 102 may be, for example, a customer-facing web application visible to a customer using a computer (e.g. computer 400) and having a video display. In an alternate embodiment, the merchant website 102 may be visible to the customer on the video display (e.g. the touchscreen video display 320) of the COTS device 112.

The securter widget 104 may be, for example, embedded in the merchant website 102. The widget 104 may be called by the processor by code from the website through commends entered in the merchant website 102 by a customer. The customer may assist operation of the widget by, for example, clicking on a "pay now" button to activate the widget.

The IDS 109 is a monitoring program, operating on the securter backend 108, periodically requesting a snapshot of memory from the COTS device 112 to check for abnormal behavior of the securter mobile app 114. The COTS device 112 may, for example send the memory snapshot for a vulnerability check 209. The mobile IDS may examine memory snapshots for vulnerability 211. The IDS 109 may, for example, examiner a plurality of COTS devices (e.g. a plurality of COTS device 112) for comparison of the securter mobile app 114 between the plurality of COTS devices. The IDS 109 uses heuristic analysis to maintain integrity of the securter mobile app 114 by checking for modifications to the securter mobile app 114 and/or modifications to the behavior of the securter mobile app 114. If there is no tampering, the IDS 109 may send a confirmation signal to the COTS device 112 and to the securter mobile app 114. Alternately, the IDS 109 may send no signal. In either case, a timer would be set to have the IDS request a new memory snapshot upon timer expiration, after which the timer is reset. If the securter mobile app 114 has been tampered with, the IDS 109 identifies the COTS device 112 as compromised and suspends the device 213. The securter mobile app 114 may, for example, notify the customer that the COTS device 112 is compromised and that it has been suspended for payment transactions. This would prevent customers from using the securter mobile app 114 for payment transactions. The IDS 109 may, for example, continue to make periodic memory snapshot requests for a time to determine if the issue has been resolved. If the device is no longer compromised, the COTS device 112 may be, for example, reinstated and allowed to make payment transactions.

Figure 2:
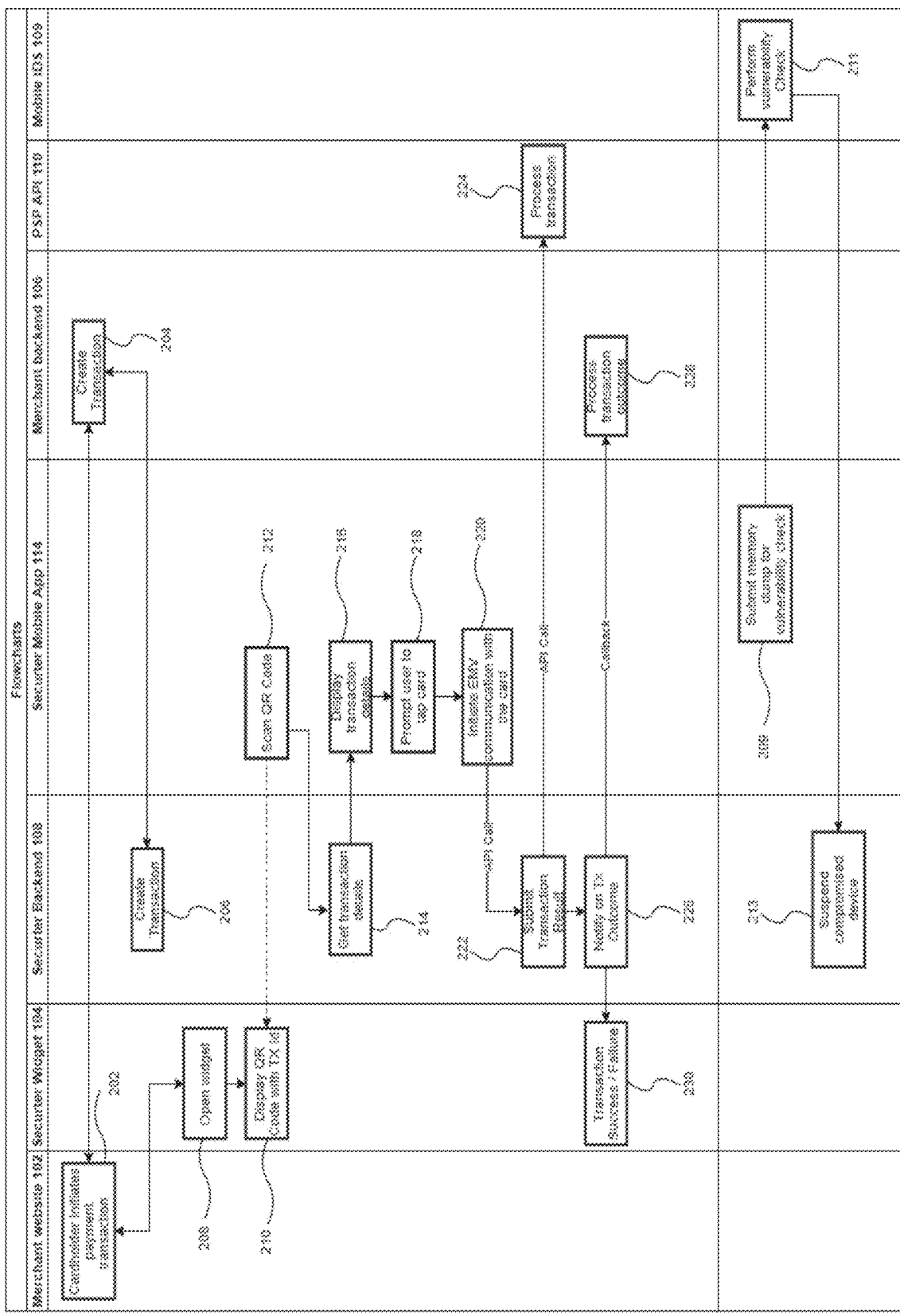
FIG. 2 depicts a flowchart diagram of a payment solution process of the payment solution system of FIG. 1, in accordance with one or more embodiments set forth herein.

With reference to FIG. 2, a flowchart diagram depicting the sequence of operations during the processing of a payment transaction. A customer may assist steps of the process through interaction with the website 102 and/or the widget 104 by using input/output devices such as a keyboard, mouse, and video display on a computer (e.g. the computer 500). The customer may, for example, assist the process by initiating a payment transaction 202 on the merchant website 102 through the input/output device by clicking widget 104, thus activating the widget 208. By the first processor (e.g. the processor on the first server 160 of FIG. 1A), a transaction request 204 may be, for example, communicated by the widget 104 to the merchant backend 106. The merchant backend 106 encrypts transaction data from the merchant website 102 and provided by the widget 104 forming a transaction request and sends the transaction request 204 to the securter backend 108 by the network (e.g. network 135). The transaction request 204 from the merchant backend 106 may include, for example, the transaction initiation communication 234 or any other details to complete an internet-based payment card purchase transaction. By the second processor (e.g. the processor of the second server 155), the securter backend 108 receives the transaction request 204 from the network (e.g. network 135). By the second processor, the securter backend 108 decrypts the transaction request. By the second processor, a transaction 206 having a unique transaction identifier or transaction id is created, the data from the transaction request 204 is associated with transaction 206, and the data is placed in storage (e.g. storage 402, such as a database). By the second processor, the transaction id associated with the transaction 206 is sent via network (e.g. network 135) to the merchant backend 106. The transaction id may, for example, be encrypted until received by the merchant backend 106 for decryption or the transaction id may remain unencrypted. The merchant backend 106 by the first processor sends the unencrypted transaction id to the securter widget 104. The securter widget 104 received the transaction identifier. The securter widget 104 creates a quick response ("QR") code with the transaction id embedded. By the first processor, the QR code is sent by the widget 104, through the network 135, to the customer's computer 150 (e.g. the computer 500) and the QR code 210 is displayed on the video display.

With continued reference to FIG. 2, the transaction id is a unique number which identifies the transaction but maintains the anonymity of the payer and the payment method. The QR code and transaction id does not contain any information which may be usable to identify the customer, the payment method, or the payment details. In other embodiments, the QR code may, for example, contain encoded data requesting that the securter mobile app 114 be activated.

The securter mobile app 114 may be, for example, activated with assistance from the user (i.e. the customer) before scanning the QR code or by the processor (e.g. processor 312), the securter mobile app 144 may be activated by a scanning application which is standard on most COTS devices (e.g. COTS device 112) receiving instructions from encoded data. With continuing reference to FIG. 2, the QR code may be scanned 212 by the camera (e.g. camera 340) of the COTS device 112 using the scanning application. The camera or similar video input device, by the processor (e.g. processor 312), communicates with the securter mobile app 114, transferring the QR Code to the securter mobile app 114. By the processor (e.g. processor 312), the securter mobile app 114 extracts the transaction ID from the scanned QR code for further action by the securter mobile app 114. Using the transaction ID the securter mobile app 114, by the processor (e.g. processor 312), sends a requests through the network 135 for transaction details 214 from securter backend 108. The securter backend 108, by the processor (e.g. the processor 408), sends transaction details through the network 135 to the securter mobile app 114. The securter mobile app 114 by the processor (e.g. the processor 312) displays transaction details 216 on the video display (e.g. touchscreen video display 320) of the COTS device 112.

The transaction details 214 may, for example, include the transaction initiation communication 234, or any other details to complete an internet-based payment card purchase transaction.

The customer may assist the process by approving or declining the transaction. If the transaction is declined, the process ends. The customer may, for example, restart the payment process. Once the customer approves the payment, the securter mobile app 114 prompts the customer for payment 218. The prompt for payment 218 may, for example, include a prompt to tap the payment card 120 on the COTS device 112. The term "tap" the payment card 120 may include making actual physical contact between the card microchip 363 and the COTS device 112 or placing the card microchip 363 in sufficiently close proximity for the NFC sensor 336 to communicate with the card microchip 363. The securter mobile app 114, by the processor, initiates an EMV communication 220 with the smart card. Using the NFC driver 118, the EMV library 116 initiates communication with the payment card 120 and by the processor, collecting payment data from the payment card 120.

The NFC driver 118, through the NFC chip (e.g. the NFC type radio transceiver of the NFC sensor 336, connected to the NFC transceiver antenna 338 of FIG. 3), receives payment card data through transmissions from the card microchip (e.g. the card microchip 363 of FIG. 3) on the payment card 120. Data from the payment card 120 may be transferred in an encrypted format to the EMV library 116, where by the processor (e.g. processor 312 of FIG. 3), the payment card data is decrypted. The decrypted data may be authenticated by the EMV library 116. Data from the payment card 120 in the form of EMV transaction results, such as, a primary account number (PAN) of the payment card is associated with the transaction id and stored temporarily within the short term memory (e.g. RAM 316 of FIG. 3) of the COTS device 112. The transaction results associated with the transaction id may, for example, be passed by the processor (e.g. processor 312 of FIG. 3), to the securter mobile app 114 where the PAN and/or other transaction results data is encrypted using an app public key. The encrypted data may then be transmitted by the network 135 submitting the EMV transaction result 222 to the securter backend 108. The securter backend 108, by the second processor (e.g. processor 408 of FIG. 4), receives the EMV transaction results and decrypts the EMV transaction results 222. The securter backend 108 may, for example, decrypt the PAN encryption, sending payment information to the PSP, without storing the primary account number. The securter backend 108, by the second processor (e.g. processor 408 of FIG. 4), associates the transaction data and the transaction id with the transaction 206 and sends the EMV transaction result to the PSP API and to the PSP gateway 110. The process of decryption and transmission to the PSP API may be, for example, completed in the memory (e.g. RAM 412 in FIG. 4) of the second server 155. The PSP gateway 110 transmits the data, by network 135, to the PSP server 130 using, where the PSP processes the transaction 224.

The EMV transaction results include the PAN, but may also include, for example, the card expiration date, the cardholder's name, the card verification value (CVV), and/or other information associated with the payment card. What is included in the EMV transaction results may also be determined by an issuer kernel in the issuer kernel programs repository 620.

As depicted in FIGS. 1-2, the embodiment maintains payment transaction anonymity by keeping customer and payment information encrypted, and by not storing payment information other than in the RAM. Payment information may also, for example, be discarded or in some embodiments removed from memory. By using this approach, payment security is maintained through the payment system 100. By using this approach, L2 certification is maintained for the EMV libraries but due to the libraries being non-embedded in the software, certification for the securter mobile app 114 may, for example, be unnecessary.

The securter backend 108 receives, by the second processor and via the network 135, data confirming the success or failure of the transaction 226. The securter backend 108, by the second processor over the network 135, communicates the transaction results to the merchant backend 106 and the securter widget 104. For a successful transaction, the merchant backend 106, by the processor, receives a successful payment transaction 228 and completes the sales transaction. Funds are transferred by the PSP to the merchant as agreed between the merchant and the PSP. The securter widget 104, by the processor, receives the successful transaction and sends data to the computer 150, displaying the transaction outcome 230 to the customer on the video display.

The transaction 206 may remain stored on the securter backend 108, however neither the PAN nor any payment data is retained.

If the PSP does not approve the transaction, a failure notice may be sent indicating that the transaction was not successful. A failure notice may include, for example, the transaction id and/or an error code or failure status code providing details about the failure. If the transaction is not successful, the securter backend 108, by the second processor, identifies the transaction by the transaction id and returns the failure notice to the securter mobile app 114. The customer may be, for example, asked to try paying using an alternate payment card. The customer may assist the process by choosing to cancel the transaction or to repeat the payment process using an alternate card. In circumstances were there may be multiple failed attempts, it may be possible to identify the COTS device 112 and to suspend further payment attempts.

In an alternate embodiment, the COTS device 112 may be used to access the merchant website 102, with input/output being through, for example, the touchscreen display (e.g. the touchscreen display 320) or a connected video display, a keyboard, a mouse, or similar data input/output devices. In such a configuration, computer 150 would not be part of the process. The payment transaction would be performed through COTS device 112. At the time for transaction payment, the merchant website 102 sends a request to the merchant backend 106 requesting creation of a transaction. The merchant backend 106 requests the securter backend 108 to create a transaction 204. Securter backend 108 creates a transaction 204 and returns transaction id associated with the created transaction to the merchant backend 106. The merchant backend 106 contacts the merchant website 102 sending an open signal 208 to the securter widget 104, and sending the transaction id to the securter widget 104. The securter widget 104 creates a QR code. The securter widget 104, through instructions to the merchant website 102, sends the QR code through the network 135 to the COTS device 112 and displays the QR code 210 on the display (e.g. touchscreen display 320). The customer may, for example, assist the process by activating the securter mobile app 114 or the widget may provide data with the QR code 210 to activate the securter mobile app 114. By the processor (e.g. processor 312), the securter mobile app 114 extracts the transaction ID from the scanned QR code for further action by the securter mobile app 114. The process would continue as described above until the securter widget 114 sends the transaction outcome 230. The securter widget 104, by the processor, sends the transaction outcome 230 by network to the COTS device 112, displaying the transaction outcome 230 to the customer on the video display (e.g. touchscreen display 320).

With reference to FIG. 2, a QR code is created 210 and displayed to the customer, however any matrix barcode may be used in its place.

In another embodiment, the COTS device 112 may be used to complete a payment transaction without having to use a computer or go through an input/output device of the computer (e.g. computer 150). With reference to FIG. 2, a customer may assist steps of the process through interaction with the website 102 and/or the widget 104 by using input/output devices of the COTS device 112 such as the keypad (e.g. keypad 330 of FIG. 3), the touchscreen (e.g. touchscreen 320 of FIG. 3), or the microphone (e.g. microphone 302 of FIG. 3). The customer may, for example, assist the process by initiating the payment transaction 202 on the merchant website 102 through the input/output devices by clicking widget 104, thus activating the widget 208. By the first processor (e.g. the processor on the first server 160 of FIG. 1A), the transaction request 204 may be, for example, communicated by the widget 104 to the merchant backend 106. The merchant backend 106 encrypts transaction data from the merchant website 102 and provided by the widget 104 forming a transaction request and sends the transaction request 204 to the securter backend 108 by the network (e.g. network 135). The transaction request 204 from the merchant backend 106 may include, for example, the transaction initiation communication 234 or any other details to complete an internet-based payment card purchase transaction. By the second processor (e.g. the processor of the second server 155), the securter backend 108 receives the transaction request 204 from the network (e.g. network 135). By the second processor, the securter backend 108 decrypts the transaction request. By the second processor, a transaction 206 having a unique transaction identifier or transaction id is created, the data from the transaction request 204 is associated with transaction 206, and the data is placed in storage (e.g. storage 402, such as a database). By the second processor, the transaction id associated with the transaction 206 is sent via network (e.g. network 135) to the merchant backend 106. The transaction id may, for example, be encrypted until received by the merchant backend 106 for decryption or the transaction id may remain unencrypted. The merchant backend 106 by the first processor sends the unencrypted transaction id to the securter widget 104. The securter widget 104 received the transaction identifier. The securter widget 104 creates a quick response ("QR") code with the transaction id embedded. By the first processor, the QR code is sent by the widget 104, through the network 135, to the COTS device 112 and the QR code 210 is displayed on the touchscreen (e.g. touchscreen 320). The display of the QR code 210 may also include a prompt for the user to select payment using the device displaying the QR code or there may be instructions present in the communication from the widget 104 to automatically launch the securter mobile app 114. The step of scanning the QR code 212 is modified, since scanning is unnecessary to get the QR code onto the COTS device 112. The securter mobile app 114 may, for example, collect the transaction id from the QR code or directly from the widget 104. The securter mobile app 114 would send the transaction id to the securter backend 108 via the network 135 to get the transaction details 214, displaying the transaction details 216, and continuing the payment process as described above. The payment process steps have been described in detail above and for the sake of brevity, the remaining steps will not be repeated.

As an alternative to physical cards, there are several "wallet" programs that store payment card information for use with payment terminals. Examples of such wallet programs include Google Pay®, Apple Pay®, or Samsung Pay®. In another embodiment of payment system 100, with reference to FIG. 2, when the user is prompted to tap a payment card 218, a user may instead activate a wallet program. The wallet programs contain commands to perform a programming equivalent to tapping a payment card and already have built commends for communication with the EMV library 116. NFC communication would not be required as there is direct communication between the wallet program and the EMV library 116. Thus, by activating a wallet program, communication with the EMV library 116 is initiated and payment details are sent to the EMV library 116 for decryption and further processing. The EMV transaction results including PAN are decrypted and sent to the securter mobile app 114 for encryption and transmission to the securter backend 108. The transaction results and PAN are decrypted and transmitted to the PSP API for submission to the PSP 222 through the PSP gateway. The payment process steps have been described in detail and for the sake of brevity, the remaining steps will not be repeated.

A method for submitting a payment card payment using an unattended commercial off-the-shelf mobile device as described above and in the accompanying figures includes: initiating a payment transaction on a merchant website using a computer by clicking a widget program 202; communicating payment transaction data to a merchant backend on a merchant server 204 and creating a transaction comprising data from the payment transaction; communicating payment transaction data to a backend application on a backend server where the transaction data is created 206, stored, and associated with a transaction id; communicating the transaction id to the merchant backend; communicating the transaction id to the merchant website; creating a matrix barcode including the transaction id, opening the widget program 208 and displaying a matrix barcode with the transaction id 210; activating a mobile payment application on a commercial off-the-shelf mobile device; scanning the matrix barcode on the mobile payment application 212; getting payment transaction data from the backend application 214; displaying transaction details of the payment transaction data the mobile payment application 216; prompting a user to tap a payment card on the commercial off-the-shelf mobile device 218; initiating EMV communication with an EMV library on the commercial off-the-shelf mobile device between the payment card and the EMV library 220; submitting transaction results from the EMV library to the mobile payment application and submitting the transaction results to the backend application 222; submitting transaction results to the payment service provider; receiving a transaction outcome response from the payment service provider 224; receiving a response from the payment service provider; notifying the widget program to display the transaction outcome response 228 and notifying the merchant backend of the transaction outcome response 230.

The present invention may be a system, a method, and/or a computer program product at any possible technical detail level of integration. The computer program product may include a computer readable storage medium (or media) having computer readable program instructions thereon for causing a processor to carry out aspects of the present invention.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C #, Java, Python, etc.

The terms software, application, program code, computer program code, code, computer program product, and executable instructions, are used interchangeably throughout this application. Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various embodiments are described above, these are only examples. For example, computing environments of other architectures can be used to incorporate and use one or more embodiments.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A computer-implemented method comprising:
submitting, by a first processor, a payment transaction through a network to a merchant website;
receiving, by a second processor, said payment transaction and directing said payment transaction to activate a widget program on said merchant website;
submitting, by said second processor, a payment transaction request from said widget program through said network to a backend application;
receiving, by a third processor, said payment transaction request, said backend application creates, by the third processor, a transaction identification number;
submitting, by said third processor, said transaction identification number through the network to said widget program;
receiving, by said second processor, said transaction identification number and directing said transaction identification number to said widget program;
converting, by said widget program, said transaction identification number into a matrix barcode and submitting said matrix barcode through the network to said first processor;
displaying, by said first processor, said matrix barcode on a first graphical user interface;
using a mobile computing device to scan said matrix barcode, said mobile computing device having a fourth processor, memory, a graphical user interface, a near field communication device, a mobile payment application, and an Europay, MasterCard, Visa (EMV) library, said EMV library being non-embedded in said mobile payment application;
converting, by said fourth processor, said matrix barcode into a request for payment by a payment card having a card microchip;
displaying, by said fourth processor, said request for payment on said mobile computing device graphical user interface by said mobile payment application;
placing said card microchip of said payment card in proximity to said near field communication (NFC) sensor, said card microchip communicates with said NFC sensor;
receiving instructions from the EMV library, by said fourth processor, the NFC sensor receives payment data from said card microchip;
submitting said payment data to said mobile application;
encrypting, by said fourth processor, said payment data and transaction identification number using a public key of said mobile computing app;
submitting, by said fourth processor, encrypted payment data and said transaction identification number through said network to said backend application;
receiving, by said third processor, encrypted payment data and said transaction identification number;
decrypting, by said third processor, encrypted payment data and said transaction identification number;
submitting, by said third processor, payment data to a payment service provider through the network;
receiving, by said third processors, from said payment service provider a transaction result;
sending, by said third processor, said transaction result, through said network to said second processor and said fourth processor;
sending, by said second processor, said transaction result through said network to said first processor;
receiving, by said fourth processor, said transaction result and displaying on said mobile computing device graphical user interface; and
receiving, by said first processor, transaction results and displaying on said second graphical user interface.

2. The method of claim 1, further comprising:
the backend application storing said payment transaction request, by the third processor; and
associating said stored payment transaction request with said transaction identification number.

3. The method of claim 1, wherein converting, by said fourth processor, said matrix barcode into a request for payment by a payment card having a card microchip comprises:
submitting the transaction id, by network, to the backend application;
receiving, by the network, from the backend application encrypted data;
decrypting said data by said mobile payment application; and
creating said request for payment.

4. The method of claim 2, wherein decrypting, by said third processor, encrypted payment data and said transaction identification number comprises:

storing encrypted payment data and said transaction identification number in a memory of a backend server hosting said backend application;

decrypting said encrypted payment data and said transaction identification number using a private key of said backend application.

5. The method of claim 4, wherein submitting, by said third processor, payment data to a payment service provider through the network comprises:

submitting said decrypted payment data stored in the memory by a gateway application programming interface (API) and sending said decrypted payment data to a payment service provider (PSP) gateway;

submitting, by said PSP gateway, payment data to a payment service provider through said network.

6. The method of claim 1, wherein said mobile payment application notifies the EMV library of said payment request.

7. The method of claim 1, wherein receiving instructions from the EMV library, by said fourth processor, the NFC sensor receives payment data from said card microchip comprises:

said card microchip and said NFC sensor activating a payment card issuer kernel said payment card issuer kernel providing instructions to said NFC sensor for collecting data from said card microchip; and transmitting payment data from said card microchip to said NFC sensor.

8. The method of claim 1, wherein said EMV Library submits payment data to said mobile application, and said payment data is stored in the memory.

9. The method of claim 1, wherein receiving said transaction result comprises a positive notification, a transfer of funds, and a notification of transaction completion.

10. The method of claim 1, wherein receiving said transaction result comprises:

a negative notification; and a request to use another payment card to complete said payment transaction or an option to cancel said payment transaction.

11. The method of claim 1, further comprising monitoring said mobile payment application for program consistency using said backend application, further having a mobile intrusion detection system (IDS).

12. The method of claim 11 further comprising:

requesting a snapshot of the memory of the mobile computing device from the fourth processor, the IDS at a set interval, by the second processor, receives the snapshot of the memory and examines data from the snapshot of the memory for unauthorized changes to the mobile payment application.

13. The method of claim 12, wherein detecting unauthorized changes to the mobile application, the intrusion detection system notifies the backend application; and wherein receiving notification of unauthorized changes, the backend application suspends the mobile computing device and the mobile payment application from use in payment transactions.

14. The method of claim 1, wherein said payment transaction request has a transaction amount, a currency code, a transaction type, and a merchant ID.

15. The method of claim 1, wherein said matrix barcode is a QR code.

16. A system comprising:

a plurality of computers each having a memory; and one or more processor in communications with the memory;

program instructions executable by the one or more processors via the memory to perform a method, the method comprising: wherein the system is configured to perform a method, the method comprising:

a computer-implemented method comprising:

submitting, by a first processor, a payment transaction through a network to a merchant website;

receiving, by a second processor, said payment transaction and directing said payment transaction to activate a widget program on said merchant website;

submitting, by said second processor, a payment transaction request from said widget program through said network to a backend application;

receiving, by a third processor, said payment transaction request, said backend application creates, by the third processor, a transaction identification number;

submitting, by said third processor, said transaction identification number through the network to said widget program;

receiving, by said second processor, said transaction identification number and directing said transaction identification number to said widget program;

converting, by said widget program, said transaction identification number into a matrix barcode and submitting said matrix barcode through the network to said first processor;

displaying, by said first processor, said matrix barcode on a first graphical user interface;

using a mobile computing device to scan said matrix barcode, said mobile computing device having a fourth processor, memory, a graphical user interface, a near field communication device, a mobile payment application, and an Europay, MasterCard, Visa (EMV) library, said EMV library being non-embedded in said mobile payment application;

converting, by said fourth processor, said matrix barcode into a request for payment by a payment card having a card microchip;

displaying, by said fourth processor, said request for payment on said mobile computing device graphical user interface by said mobile payment application;

placing said card microchip of said payment card in proximity to said near field communication (NFC) sensor, said card microchip communicates with said NFC sensor;

receiving instructions from the EMV library, by said fourth processor, the NFC sensor receives payment data from said card microchip;

submitting said payment data to said mobile application;

encrypting, by said fourth processor, said payment data and transaction identification number using a public key of said mobile computing app;

submitting, by said fourth processor, encrypted payment data and said transaction identification number through said network to said backend application;

receiving, by said third processor, encrypted payment data and said transaction identification number;

decrypting, by said third processor, encrypted payment data and said transaction identification number;

submitting, by said third processor, payment data to a payment service provider through the network;

receiving, by said third processors, from said payment service provider a transaction result;

sending, by said third processor, said transaction result, through said network to said second processor and said fourth processor;

sending, by said second processor, said transaction result through said network to said first processor;

receiving, by said fourth processor, said transaction result and displaying on said mobile computing device graphical user interface; and receiving, by said first processor, transaction results and displaying on said second graphical user interface.

17. The system of claim 16, further comprising:

an intrusion detection system, said intrusion detection system communicating with said backend application and connected by said network to said mobile payment application stored on said mobile computing device; wherein said intrusion detection system, by said second processor, requests a snapshot of the memory of said mobile computing device; wherein said mobile computing device, by said fourth processor, sends the snapshot of the memory to said intrusion detection system; and wherein said intrusion detection system examines the snapshot of the memory for unauthorized changes to said mobile payment application.

18. A computer program product comprising:

a computer readable storage medium readable by one or more processors and storing instructions for execution by one or more processors for performing a method comprising:

a computer-implemented method comprising:

submitting, by a first processor, a payment transaction through a network to a merchant website;

receiving, by a second processor, said payment transaction and directing said payment transaction to activate a widget program on said merchant website;

submitting, by said second processor, a payment transaction request from said widget program through said network to a backend application;

receiving, by a third processor, said payment transaction request, said backend application creates, by the third processor, a transaction identification number;

submitting, by said third processor, said transaction identification number through the network to said widget program;

receiving, by said second processor, said transaction identification number and directing said transaction identification number to said widget program;

converting, by said widget program, said transaction identification number into a matrix barcode and submitting said matrix barcode through the network to said first processor;

displaying, by said first processor, said matrix barcode on a first graphical user interface;

using a mobile computing device to scan said matrix barcode, said mobile computing device having a fourth processor, memory, a graphical user interface, a near field communication device, a mobile payment application, and an Europay, MasterCard, Visa (EMV) library, said EMV library being non-embedded in said mobile payment application;

converting, by said fourth processor, said matrix barcode into a request for payment by a payment card having a card microchip;

displaying, by said fourth processor, said request for payment on said mobile computing device graphical user interface by said mobile payment application;

placing said card microchip of said payment card in proximity to said near field communication (NFC) sensor, said card microchip communicates with said NFC sensor;

receiving instructions from the EMV library, by said fourth processor, the NFC sensor receives payment data from said card microchip;

submitting said payment data to said mobile application;

encrypting, by said fourth processor, said payment data and transaction identification number using a public key of said mobile computing app;

submitting, by said fourth processor, encrypted payment data and said transaction identification number through said network to said backend application;

receiving, by said third processor, encrypted payment data and said transaction identification number;

decrypting, by said third processor, encrypted payment data and said transaction identification number;

submitting, by said third processor, payment data to a payment service provider through the network;

receiving, by said third processors, from said payment service provider a transaction result;

sending, by said third processor, said transaction result, through said network to said second processor and said fourth processor;

sending, by said second processor, said transaction result through said network to said first processor;

receiving, by said fourth processor, said transaction result and displaying on said mobile computing device graphical user interface; and receiving, by said first processor, transaction results and displaying on said second graphical user interface.

19. A computer-implemented method comprising:

submitting, by a mobile computing device, a payment transaction through a network to a merchant website, said mobile computing device having a first processor, memory, a graphical user interface, a near field communication device, a mobile payment application, and an Europay, MasterCard, Visa (EMV) library, said EMV library being non-embedded in said mobile payment application;

receiving, by a second processor, said payment transaction and directing said payment transaction to activate a widget program on said merchant website;

submitting, by said second processor, a payment transaction request from said widget program through said network to a backend application;

receiving, by a third processor, said payment transaction request, said backend application creates, by the third processor, a transaction identification number;

submitting, by said third processor, said transaction identification number through the network to said widget program;

receiving, by said second processor, said transaction identification number and directing said transaction identification number to said widget program;

converting, by said widget program, said transaction identification number into confirmation data through the network to said first processor;

converting, by said first processor, said confirmation data into a request for payment by a payment card having a card microchip and displaying said confirmation data on said graphical user interface;

placing said card microchip of said payment card in proximity to said near field communication (NFC) sensor, said card microchip communicates with said NFC sensor;

receiving instructions from the EMV library, by said first processor, the NFC sensor receives payment data from said card microchip;

submitting said payment data to said mobile application;

encrypting, by said first processor, said payment data and transaction identification number using a public key of said mobile computing app;

submitting, by said first processor, encrypted payment data and said transaction identification number through said network to said backend application;

receiving, by said third processor, encrypted payment data and said transaction identification number;

decrypting, by said third processor, encrypted payment data and said transaction identification number;

submitting, by said third processor, payment data to a payment service provider through the network;

receiving, by said third processors, from said payment service provider a transaction result;

sending, by said third processor, said transaction result, through said network to said second processor and said first processor;

sending, by said second processor, said transaction result through said network to said first processor;

receiving, by said first processor, transaction results and displaying on said graphical user interface.

20. The method of claim 19, further comprising:

the backend application storing said payment transaction request, by the third processor; and associating said stored payment transaction request with said transaction identification number.

21. The method of claim 19, wherein converting, by said first processor, said confirmation data into a request for payment by a payment card having a card microchip comprises:

submitting the transaction id, by network, to the backend application;

receiving, by the network, from the backend application encrypted data;

decrypting said data by said mobile payment application; and creating said request for payment.

22. The method of claim 20, wherein decrypting, by said third processor, encrypted payment data and said transaction identification number comprises:

storing encrypted payment data and said transaction identification number in a memory of a backend server hosting said backend application;

decrypting said encrypted payment data and said transaction identification number using a private key of said backend application.

23. The method of claim 22, wherein submitting, by said third processor, payment data to a payment service provider through the network comprises:

submitting said decrypted payment data stored in the memory by a gateway application programming interface (API) and sending said decrypted payment data to a payment service provider (PSP) gateway;

submitting, by said PSP gateway, payment data to a payment service provider through said network.

24. The method of claim 19, wherein said mobile payment application notifies the EMV library of said payment request.

25. The method of claim 19, wherein receiving instructions from the EMV library, by said fourth processor, the NFC sensor receives payment data from said card microchip comprises:

said card microchip and said NFC sensor activating a payment card issuer kernel said payment card issuer kernel providing instructions to said NFC sensor for collecting data from said card microchip; and transmitting payment data from said card microchip to said NFC sensor.

26. The method of claim 19, wherein said EMV Library submits payment data to said mobile application, and said payment data is stored in the memory.

27. The method of claim 19, wherein receiving said transaction result comprises a positive notification, a transfer of funds, and a notification of transaction completion.

28. The method of claim 19, wherein receiving said transaction result comprises:

a negative notification; and a request to use another payment card to complete said payment transaction or an option to cancel said payment transaction.

29. The method of claim 19, wherein monitoring said mobile payment application for program consistency comprises said backend application further having a mobile intrusion detection system (IDS).

30. The method of claim 29 further comprising:

requesting a snapshot of the memory of the mobile computing device from the fourth processor, the IDS at a set interval, by the second processor, receives the snapshot of the memory and examines data from the snapshot of the memory for unauthorized changes to the mobile payment application.

31. The method of claim 30, wherein detecting unauthorized changes to the mobile application, the intrusion detection system notifies the backend application; and wherein receiving notification of unauthorized changes, the backend application suspends the mobile computing device and the mobile payment application from use in payment transactions.

32. The method of claim 19, wherein said payment transaction request comprises a transaction amount, a currency code, a transaction type, and a merchant ID.

33. The method of claim 19, wherein said confirmation data has matrix barcode.

* * * * *